United States Patent [19]

Cusick

[11] 4,297,116
[45] Oct. 27, 1981

[54] APPARATUS FOR SEPARATING FOREIGN MATTER FROM A GAS STREAM

[75] Inventor: Kenneth M. Cusick, Amarillo, Tex.

[73] Assignee: Aitken, Inc., Houston, Tex.

[21] Appl. No.: 117,045

[22] Filed: Jan. 31, 1980

Related U.S. Application Data

[63] Continuation of Ser. No. 922,904, Jul. 10, 1978, abandoned, which is a continuation-in-part of Ser. No. 754,366, Dec. 27, 1976, abandoned, which is a continuation-in-part of Ser. No. 598,566, Jul. 24, 1975, abandoned, which is a continuation-in-part of Ser. No. 572,352, Apr. 28, 1975, abandoned.

[51] Int. Cl.³ .............................................. B01D 50/00
[52] U.S. Cl. ..................................... 55/319; 55/344; 55/350; 55/360; 55/419; 55/432; 55/484; 55/487; 55/528
[58] Field of Search ................ 55/103, 319, 321, 324, 55/343–344, 360, 350, 418–419, 462, 464, 484, 487, 521, 528, 432

[56] References Cited

U.S. PATENT DOCUMENTS

| | | | |
|---|---|---|---|
| 205,201 | 6/1878 | Morehouse | 55/344 |
| 331,785 | 12/1885 | Gogerty | 55/521 X |
| 1,359,547 | 11/1920 | Thomas | 55/464 X |
| 1,458,005 | 6/1923 | Rohrer | 55/319 |
| 1,817,338 | 8/1931 | Baker | 55/319 |
| 1,914,147 | 6/1933 | McClatchie | 55/418 |
| 1,960,657 | 5/1934 | Alexander | 55/521 X |
| 1,989,206 | 1/1935 | Magill | 55/360 X |
| 2,213,233 | 9/1940 | Tigner | 55/464 X |
| 2,876,862 | 3/1959 | Hummell | 55/464 X |
| 2,943,460 | 7/1960 | Brown | 55/521 X |
| 2,980,204 | 4/1961 | Jordan | 55/487 |
| 3,102,014 | 8/1963 | Aitkenhead | 55/487 X |
| 3,186,551 | 6/1965 | Dornauf | 55/522 X |
| 3,228,174 | 1/1966 | Perry, Jr. | 55/484 X |
| 3,280,979 | 10/1966 | King | 55/319 X |
| 3,307,335 | 3/1967 | Shomaker | 55/324 X |
| 3,454,129 | 7/1969 | Everett | 55/319 X |
| 3,470,979 | 10/1969 | Everett | 55/419 X |
| 3,483,678 | 12/1969 | Burdock et al. | 55/418 X |
| 3,519,024 | 7/1970 | Johnson et al. | 55/418 X |
| 3,599,398 | 8/1971 | Jaeger | 55/319 X |
| 3,633,343 | 1/1972 | Mark | 55/316 |
| 3,742,680 | 7/1973 | Severs | 55/103 |

FOREIGN PATENT DOCUMENTS 659545  5/1938  Fed. Rep. of Germany ........ 55/418

*Primary Examiner*—Kathleen J. Prunner
*Attorney, Agent, or Firm*—Fishburn, Gold and Litman

[57] ABSTRACT

A separator is described which includes an elongate vessel defining a chamber having a wall therein dividing the vessel into a gravity chamber and a filter chamber with the gravity chamber communicating with an inlet for receiving a contaminated gas stream containing foreign suspended particles and the filter chamber communicating with an outlet for discharging gas substantially free of foreign particles. A strainer-diffuser member having a conical side wall is inside of the gravity chamber and connected to the inlet whereby the conical side wall forms a bore converging longitudinally of the direction of gas flow from the inlet, said side wall having a plurality of holes with inner edge portions protruding inwardly in the bore and forming barriers to the flow of liquid particles over the inner surface of the conical side wall so that liquid accumulates and is jetted through the holes in liquid drops that fall to the bottom of the gravity chamber, the gas flowing through said holes into the gravity chamber. A plurality of filter elements are arranged in the filter chamber and communicate with the gravity chamber through ports in the wall dividing the vessel so that all of the gas from the gravity chamber passes into the filters and radially outwardly into the filter chamber for exit through the outlet. A sump communicates with the chambers for collecting the liquid falling from the strainer-diffuser member and filters with liquid level controls and mechanisms controlling the level of the liquid in the sump.

15 Claims, 7 Drawing Figures

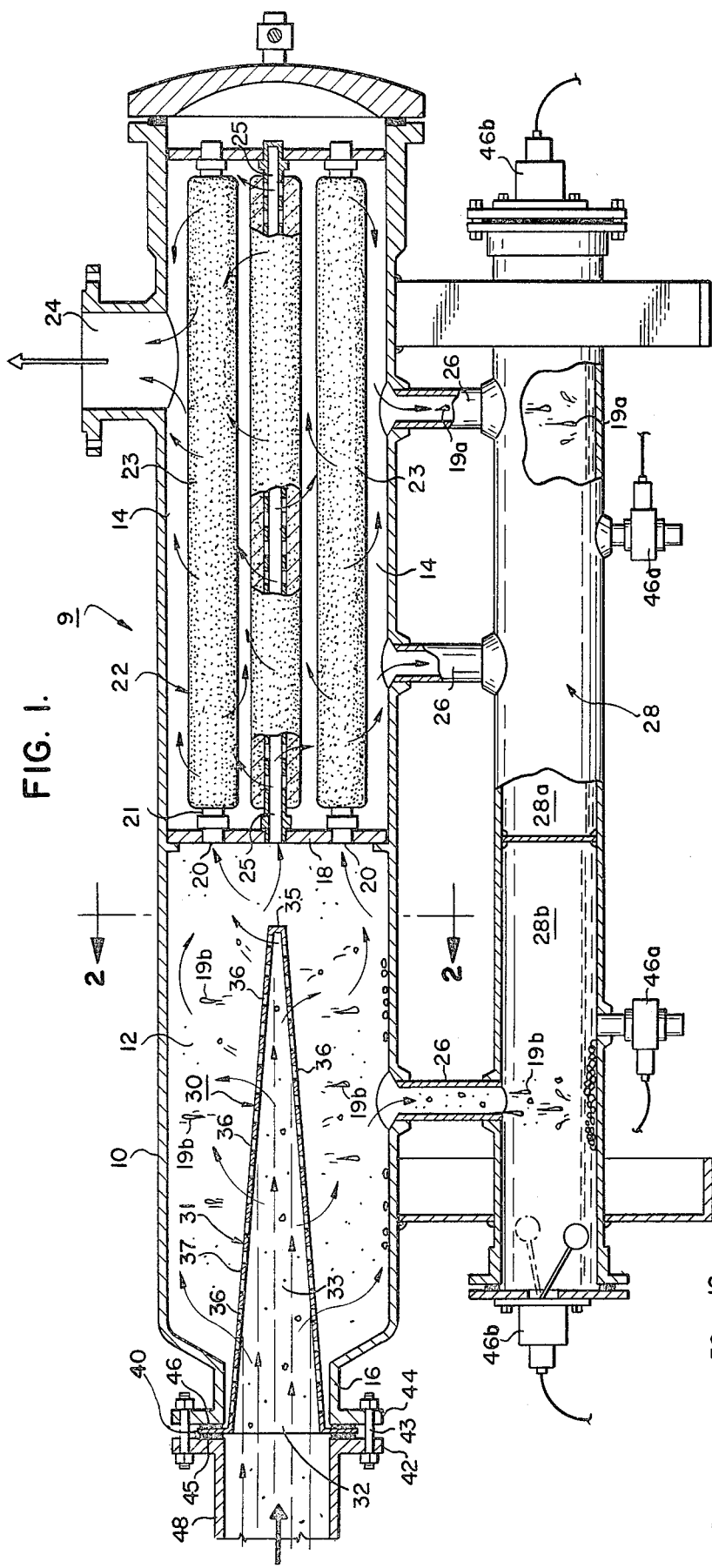

APPARATUS FOR SEPARATING FOREIGN MATTER FROM A GAS STREAM

REFERENCE TO RELATED APPLICATIONS

This application is a continuation of application Ser. No. 922,904, filed July 10, 1978, which is a continuation-in-part of application Ser. No. 754,366, filed Dec. 27, 1976, which is a continuation-in-part of application Ser. No. 598,566, filed July 24, 1975, which is a continuation-in-part of application Ser. No. 572,352, filed Apr. 28, 1975, all abandoned.

BACKGROUND OF THE INVENTION

1. Field of the Invention

This invention generally relates to strainers for initially removing most of the liquid and solid particles from a contaminated gas stream, and is particularly useful when combined with fiberglass filters which filter out the remaining very fine liquid mist and solid particles that remain in the gas stream after it passes through the strainer.

2. Prior Art

The separation of suspended liquid particles from a gas stream can be accomplished using various separators or desiccant beds. From conventional type scrubbers, separators, or mist extractors, the gas stream may carry over finely divided solid particles and aerosol-sized fogs or mists of free water, hydrocarbons, and other chemicals. The solid particles may consist of iron and silica compounds. The liquid may consist of water, hydrocarbon mist such as compressor lube oil, gasoline plant absorption oil, and field distillate depending on the type of upstream equipment. Amine based chemical inhibitors may be also present due to corrosion preventive treatment of upstream producing wells.

When using desiccant beds, molecular weight hydrocarbons will plug the micro pores of the desiccant particles thereby reducing their ability to absorb water. Repeated regeneration of a bed will cause the formation of coke which fouls the bed by sealing the surface of the desiccant particles. Some of the light crudes tend to polymerize due to a catalytic reaction with impure desiccants which can also cause bed fouling. Free water slugs will severely shatter the desiccant particles causing excessive pressure drop across the bed. The shattered particles may also be carried over into the gas stream in the form of desiccant dust which may damage downstream equipment. Aerosol salt water mists will evaporate during bed regeneration, leaving salts that plug up the micro pores of the desiccant. Absorbed amine from corrosion inhibitors will decompose and form ammonia compounds during the bed regeneration cycle. The ammonia chemically reacts with the desiccant causing loss in its activity.

The above mentioned problems are especially acute since gas wells are now being produced at or close to their maximum production rates. This tends to increase the amount of water, crude oil, and liquid hydrocarbons produced with the gas. Also, there is often an increased amount of sand, iron sulfides, and other solid contaminants entrained in the produced gas. Thus, as a result of the increased production from gas wells, the gas produced therefrom is often wetter and dirtier than would be the case if the well was produced at a reduced rate. Due to the increasing need for gas, however, it is nevertheless highly desirable to produce the wells at or close to their maximum possible production rates, and therefore it is necessary to provide improved means for removing the contaminants entrained in the gas so that only clean and very dry gas will be delivered to the pipeline.

Relatively recently liquid separators have been adapted using upstream a coalescer-filter section followed downstream by a very fine liquid separator section. The coalescer filters are supposed to remove most of the solid particles and liquid droplets from the gas before the gas is delivered to the separator section. The filters comprise perforated tubular casings covered with sleeves formed of a graded-density fiberglass material through which the gas is passed. The gas flows from the outside to the inside casing of each filter element. The very small porosity of the fiberglass material can cause any liquid mist entrained in the gas to coalesce into larger drops and fall out of the gas stream. The fiberglass also removes solid particles down to a size of under one micron.

Coalescer elements can be very efficient in removing liquid in the form of mist and the very small solid particles carried by a gas stream, but, when used as above described, the outer surfaces of the filters become contaminated prematurely by the foreign matter, thereby sealing the outer layers of the fiberglass. The fiberglass material can also become overloaded by an arriving slug of water. When the solid foreign matter in the outside layers of the fiberglass plugs up its pores, the coalesced liquid drops also tend to saturate the fiberglass. A saturated fiberglass filter must be replaced, and such replacement is relatively expensive. For example, one filter element may cost $50 or more, not counting the downtime cost for the equipment.

It is also known to use a centrifugal separator followed by a coalescer filter. But in such a unit the filter would also overload on account of the relative inefficiency of the separator. Thus, the coalescer filter can only be used in conjunction with a very efficient liquid remover or separator, and such separator was not available prior to this invention.

It is very important, therefore, that as much of the liquid and solid particles as possible be removed from the gas upstream of the coalescer stage, using means not subject to overloading, to thereby extend the useful life of the coalescer fiberglass elements, say having to replace them once a year instead of once a month, which constitutes a considerable financial saving.

It is a more specific object of this invention to provide a conically-shaped punched metallic strainer having a plurality of holes whose inner edges have perforation teeth resulting from the punching operation. The angle of the conic wall and the solidity portion of the strainer are selected to build up a desired pressure drop thereacross. The liquid drops flowing over the inner surface of the strainer and the liquid particles precipitated from the gas as a result of the pressure drop across the wall of the strainer collect around the perforation teeth which serve as barriers or "dams" for the liquid pools collected thereabout. When the volume of a particular pool becomes large enough, it will overflow causing large liquid drops to be jetted out through its adjacent hole to the outside of the strainer. Such motion is caused both by gravity and by the pressure drop across the punched wall of the strainer.

SUMMARY OF THE INVENTION

The separator comprises a metallic vessel defining a chamber having an inlet for receiving contaminated gas and an outlet for discharging very dry gas substantially free of foreign particles. A partitioning, multi-port wall extends across the chamber for dividing same into a gravity chamber and a filter chamber. A strainer-diffuser is mounted in the gravity chamber. The diffuser is formed by a conical tubular metallic member having a punched side wall defining a plurality of holes having inner perforation teeth which produce a damming effect. The open front end of the conical member is coextensive with and opposite to the gas inlet to the vessel, and its rear end is imperforate. A multi-tube filter is disposed inside the filter chamber, with each filter element mounted in a corresponding port in the partitioning wall so that gas flows radially outwardly in each filter element. The punched holes in the conical member have a diameter ranging between 1/16 to ⅛ inch, depending on the velocity of the gas and the size of anticipated solid particles. Liquid particles deposited on the solid portions of the tapered inside wall of the conical strainer collect and form liquid pools around the perforation teeth. Overflowing liquid drops from these pools are then jetted out through these holes and fall to the bottom of the gravity chamber. Solid particles larger than ⅛ inch are strained by the conical member.

BRIEF DESCRIPTION OF THE DRAWINGS

FIG. 1 is an elevational view, partly in section, of one embodiment of the separator apparatus of this invention;

FIG. 2 is a cross-sectional view, taken on line 2—2 in FIG. 1;

FIG. 3 is a planar view of a section of the punched wall of the strainer;

FIG. 4 is a sectional view of the wall shown in FIG. 3;

DETAILED DESCRIPTION OF PREFERRED EMBODIMENTS

Figure 6:
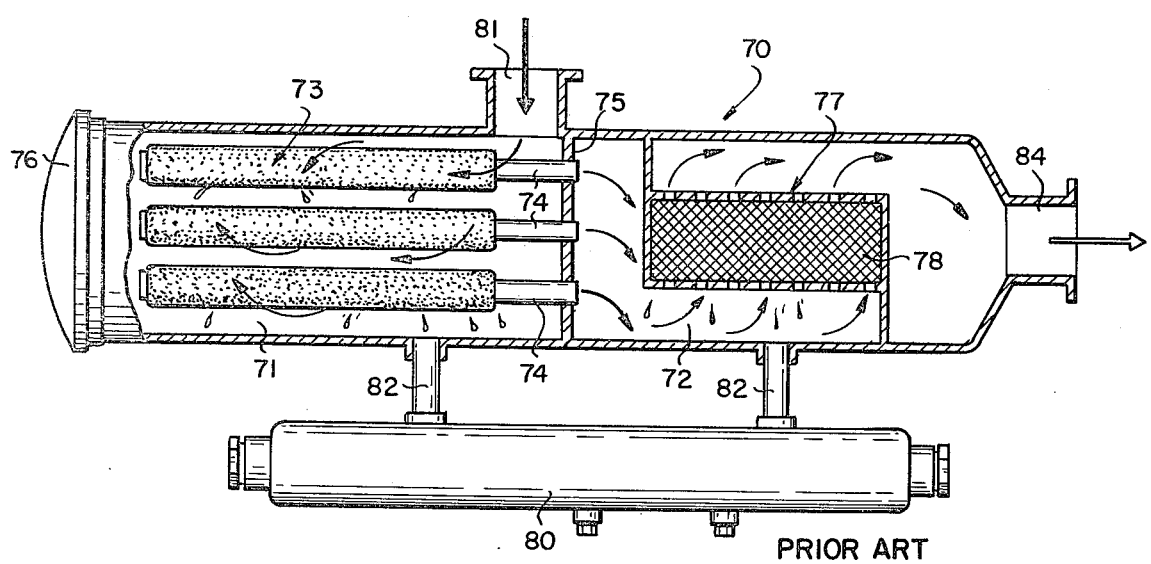
FIG. 6, labeled "Prior Art", is an elevational view, partly in section, of a known separator.

First, with reference to FIG. 6 there is shown a known filter-and-liquid-gas separator, so as to gain a better understanding of and appreciation for this invention. The unit is housed in a pressure vessel 70 separated into filter and separator chambers 71 and 72, respectively.

The filter chamber 71 contains replaceable fiberglass filter elements 73 mounted over perforated hollow casings 74 carried on a wall 75 which fluidly separates chambers 71 and 72. A quick-opening end cap 76 is provided to allow for the easy removal and installation of the fiberglass filters 73.

The separator chamber 72 houses a separator 77 of wire mesh 78. A liquid sump 80 is baffled (not shown) into two separate compartments to prevent gas flow between chambers 71 and 72.

The gas to be filtered, represented by the arrow, enters through inlet 81 into the filter chamber 71 and then penetrates the filter elements 73 from outside to the inside of casings 74. Solid particles and free liquid droplets about ten microns and larger cannot penetrate the outer surfaces of the fiberglass elements 73 because of their size. The liquid particles collect on the outer fiberglass layers into drops that fall to the bottom of chamber 71 which drains through conduit 82 into sump 80. Some solid particles will be washed away from the outer layers by the liquid droplets, while most of the other solid particles will be caught and retained in the layers of the fiberglass elements. When the solid contaminant build up in the fiberglass becomes appreciable, the pressure inside chamber 71 will also rise, necessitating frequent cleaning or replacement of the filters. Also, free water slugs and coalesced drops can saturate the fiberglass elements, thereby rendering them useless for their intended purposes.

Considering that one filter element may cost $50 or more, the replacement cost of all the filter elements on a frequent basis, say once a month, becomes substantial, not even counting the downtime cost of the system. The partially filtered gas passes through casings 74 into the separator chamber 72 where it becomes additionally filtered by the wire mesh separator 77. The gas exits through outlet port 84. Since the wire mesh separator cannot produce an appreciable pressure drop thereacross, the liquid separation is relatively inefficient.

Another serious problem with the known unit shown in FIG. 6 is that the gas entering filter chamber 71 loses velocity but when it reenters the casings 74 of the filter elements 73 it rapidly regains its velocity and tends to break up the collected liquid droplets inside the casings into fine mist which becomes turbulently projected into the separator chamber 72 which is incapable of removing a signficant portion of such mist prior to the gas exiting through exit 84.

Referring now to the invention and more particularly to the embodiment shown in FIG. 1, the separator apparatus, generally designated as 9, includes an elongated cylindrical metallic vessel 10 positioned with its longitudinal axis horizontal. It is divided into a gravity chamber 12 and a filter chamber 14 by a transverse partitioning wall 18. Chamber 12 is provided with an inlet 16 through which the wet and dirty gas enters the separator.

A plurality of ports 20 in wall 18 allow the cleaned-up gas from chamber 12 to flow out into chamber 14. A plurality of coalescer filter elements 22 are mounted in chamber 14 to remove any fine mist and/or extremely small solid particles still entrained in the gas after it leaves chamber 12. Elements 22 comprise perforated, elongated, hollow cylindrical casings 21 covered with graded-density fiberglass sleeves 23. Each casing is mounted in a corresponding port 20, so that the gas passing through ports 20 will first pass into the inside bores 25 of these casings and then will be forced to pass radially outwardly through the porous fiberglass sleeves 23. The gas now substantially free of foreign matter will exit through outlet 24 of filter chamber 14.

Larger particles are caught within the innermost layers of the graded-density fiberglass sleeves 23. Smaller particles are trapped in the progressively finer outermost sub-surface layers of the fiberglass. To withstand differential pressures as high as 100 psi or more, the fiberglass is supported by the rigid, perforated center casings 21 typically made of steel.

Thus, the graded-density fiberglass layers provide tortuous flow passages for the gas passing therethrough from inside-to-outside. Also, the passages provided are very small so that small particles of liquid about one micron and larger will become entrapped in the passages and retained as beads therein. The very small beads tend to coalesce into droplets as the gas moves through the small passages provided by the fiberglass material. As the drops progress outwardly through the layers of fiberglass they grow in size sufficiently and emerge as much larger drops 19a which due to gravity and the frictional drag of the gas fall to the bottom of chamber 14. The liquid from chamber 14 moves out through outlet pipes 26 to sump chamber 28a of sump 28.

Gravity chamber 12 includes a metallic strainer-diffuser member 30 coupled to inlet 16. All of the gas entering inlet 16 from upstream pipe 48 passes through and is diffused by diffuser 30 before it enters the gravity chamber 12. In the embodiment shown, diffuser 30 comprises a conically-shaped, tubular member 31 having a conical side wall 37 defining a bore 33 extending into chamber 12 and tapering inwardly at an angle which depends on the velocity range of the incoming gas. Its large-diameter, open front end 32 is positioned in inlet 16 so that all of the gas entering inlet 16 will also enter bore 33. The opposite, small-diameter rear end wall 35 of bore 33 is imperforate.

The conical side wall 37 of the diffuser converges in the longitudinal direction of the gas flow and is provided with a plurality of holes 36 through which all of the fluid stream exiting bore 33 must pass. The holes are of relatively small diameter ranged from 1/16 to ⅛ inch.

The angle of convergence relative to the longitudinal axis depends on the velocity of the incoming gas, the liquid load in the gas, and the physical characteristics of the liquid, especially its viscosity. The angle should be larger than 15° and smaller than 60°. If the angle is less than 15°, then there would be an insufficient liquid collection surface presented to the incoming gas, and such is the difficulty with cylindrical strainers. If the angle is greater than 60°, then the available area for the holes 36 is limited.

The number of holes 36 in and around wall 37 should be such that their total area is greater than the area of inlet 16 so that the gas will not be accelerated as it flows through the holes 36 and preferably will decrease in velocity as it moves along the longitudinal axis of bore 33 and through the holes 36 into gravity chamber 12. The total area of the holes should be about one and a half to two times the area of inlet 16.

In the gravity chamber 12, which has a flow area substantially larger than that of inlet 16, the velocity of the gas stream is further reduced. This reduction in velocity of the gas stream decreases substantially the size of liquid and solid particles that will be entrained by the gas stream into the filter chamber 14.

Figure 4A:
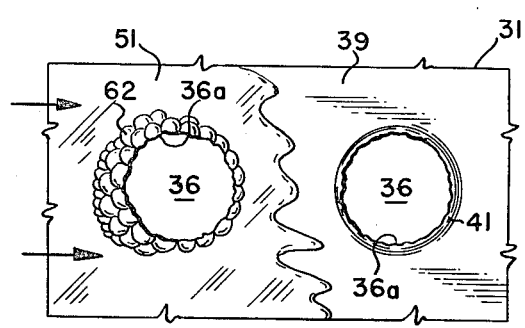
FIG. 4A is a view illustrating the perforation teeth and the formation of liquid pools thereabout.

After it enters the inlet 32 of bore 33, the gas must change directions of flow in order to pass through the perforations 36 in wall 37 of the diffuser. By providing a conically-shaped wall 37 for the diffuser, the velocity of the gas decreases and its pressure increases as it moves along the longitudinal axis of the diffuser. There develops a pressure differential across wall 37 which causes an appreciable initial fall out of the large liquid droplets and solid particles entrained in the gas. Also, the gas impinging on the tapering wall 37 deposits a stream 51 (FIG. 4) of liquid and solid particles thereon. Due to the flowing gas, the liquid and solid particles migrate along the inner surface 39 of wall 37.

The holes 36 should be provided over the entire surface of side wall 37 so that the liquid which travels along the inlet pipe 48 will be equally distributed along any cross-section of wall 37, thereby fully utilizing the collection and ejection abilities of the diffuser 30.

Holes 36 (FIG. 3) are formed by a punching press. The punching operation causes the inner edges 41 of these holes (FIG. 4) to have perforation teeth 36a that protrude inwardly into bore 33. These protruding perforation teeth act as barriers or dams for the liquid particle streams 51 migrating along the inner surface 39 of wall 37. The damming effect causes the liquid particles to form liquid pools 62 adjacent to and around the perforation teeth. When a sufficient liquid volume has collected in a pool, the gas will shear excess droplets 19b from such pool and force them to become jetted out through the adjacent hole into the bottom of gravity chamber 12.

The damming effect of teeth 36a combined with the surface tension of the liquid, causes large drops 19b to be formed and then jetted out through the holes 36. Since these drops are large and acquire acceleration as they fall, the probability is increased that they will fall to the bottom of chamber 12 due to gravity and to the frictional drag of the gas. The collected foreign matter will drain out from gravity chamber 12 through outlet 26 into sump compartment 28b.

Because the holes 36 are at least 1/16 inch, only relatively large liquid drops 19b can pass therethrough. The larger the liquid drops the greater the likelihood that they will fall by gravity to the bottom of chamber 12. Since the holes 36 are no more than ⅛ inch, the strainer 30 will retain solid particles larger than ⅛ inch in its bore 33. An additional advantage is obtained because these large drops 19b, as they fall, collect small particles of mist which they encounter, thereby further removing liquid from the gas.

It is another feature of this invention to obtain the benefit provided by the tendency of a moving stream of particles in a gas stream to become electrically charged. Diffuser 30 is therefore insulated electrically from the remainder of the piping and vessel 10 in which it is located.

In the embodiment shown in FIG. 1, diffuser 30 is provided with an annular mounting flange 40 which is bolted between opposite annular shoulders 42 and 44 by bolts 43. Shoulder 44 is on vessel 10 and shoulder 42 is on a flow line 48. Located between mounting flange 40 of the diffuser and the two shoulders holding it are insulating gaskets 45 and 46 positioned on opposite sides of mounting flange 40. The gaskets electrically insulate the diffuser from the flanges that support the diffuser inside chamber 12, and therefore from vessel 10. As the gas and the entrained liquid and solid particles move through the diffuser 30, change directions therein, and move into chamber 12, the liquid and solid particles tend to pick up positive electrical charges. Since vessel 10 is at a lower or ground potential, there will be an electrical attraction between the foreign particles and the walls of the gravity chamber 12. This attraction tends to cause the particles to move to the walls of the vessel from where they will eventually move downwardly into sump compartment 28b.

Figure 5:
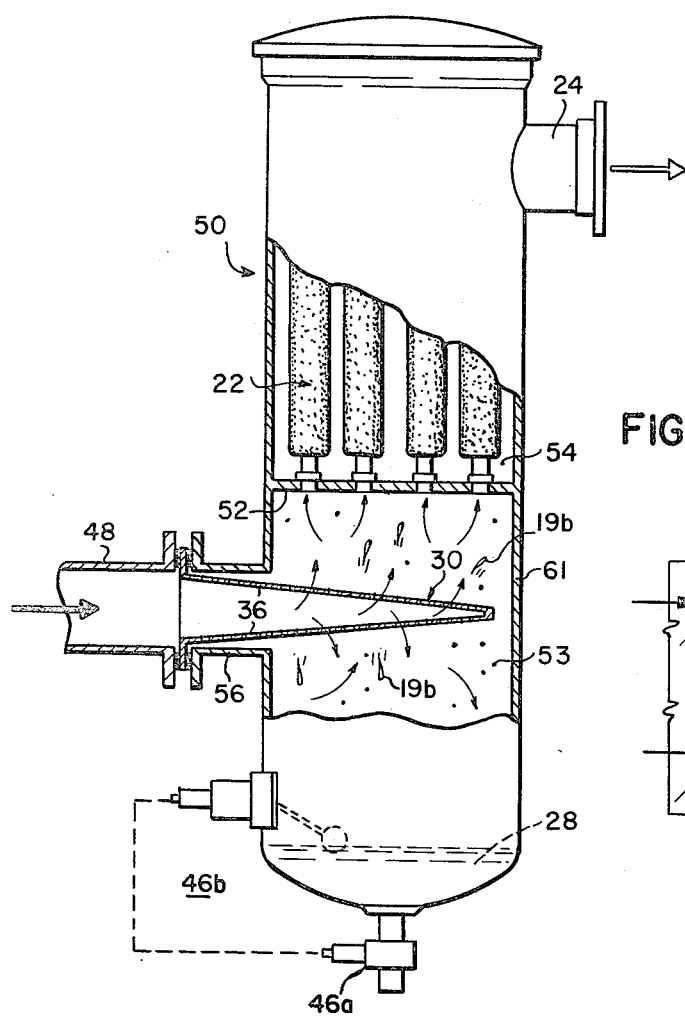
FIG. 5 is an elevational view, partly in section, of another embodiment of this invention.

FIG. 5 shows an alternate embodiment of the invention in which a metallic cylindrical vessel 50 is positioned with its longitudinal axis extending vertically. The vessel is divided by a partitioning wall 52 into a gravity chamber 53 and filter chamber 54. Coalescer-filter elements 22 are positioned in the same manner as they were in the first embodiment (FIG. 1), except, of course, they extend vertically. Inlet 56 connects the vessel with a flow line 48 through which gas containing foreign matter may enter the vessel. The diffuser 30 is constructed in the same manner as described above and is mounted in inlet 56 to be electrically insulated from vessel 50 and inlet 56.

One advantage obtained by this vertical arrangement is that the gas exiting diffuser 30 must move upwardly to enter the filter chamber 54. This increases the chances that gravity will cause the liquid and solid particles entrained in the gas to fall out of the gas stream to the bottom of the gravity chamber before the gas can carry them into the filter chamber 54.

As shown in FIG. 5, the large liquid droplets 19b carried by the gas discharged from diffuser 30 will fall downwardly while the gas stream is moving upwardly. This effect also increases the probability of collision between the large drops 19b and any fine mist that may be present in the gas, thereby causing the large drops to entrain such fine mist as they fall toward the bottom of gravity chamber 53. In the same manner, the gas moving laterally from the diffuser 30 will engage the side wall 61 of chamber 53 which will cause any droplets and much of the mist carried by this portion of the gas stream to be deposited on side wall 61 from which they will migrate downwardly to the sump 28.

Conventional liquid level control valves, such as valves 46a, and float mechanisms 46b are provided at sump outlets to control the level of the liquid in the horizontal and vertical embodiments shown in FIGS. 1 and 5.

The initial separation by strainer 30 achieves an efficiency of up to 90%. Since the damming effect of perforation teeth 36a increases the size of the droplets 19b being jetted out, their increased weight will increase the chances of them falling by gravity to sump 28b. Thus a minimum of foreign particles will be entrained into the filter elements, thereby greatly reducing the required frequency of replacement thereof.

In both horizontal and vertical embodiments, the diffuser 30 will remove most of the liquid and solid particles from the contaminated gas stream as well as occasional free slugs of water, thereby avoiding the saturation of the fiberglass filters and appreciably improving the overall separation efficiency, say up to 99%+.

What is claimed is:

1. A separator for receiving an incoming contaminated gas stream containing foreign suspended particles therein, comprising:
    (a) an elongate vessel defining a chamber having an inlet for receiving said contaminated gas stream and an outlet for discharging gas substantially free of said foreign particles;
    (b) an imperforate wall in said chamber between said inlet and said outlet for dividing said chamber into a separate gravity chamber having said inlet and a separate filter chamber having said outlet, said wall having at least one port therethrough;
    (c) a conical strainer-diffuser member disposed inside said gravity chamber and connected relative to said inlet to receive contaminated gas flow therefrom, said strainer-diffuser member having:
        (1) a conical side wall forming a conical bore tapering inwardly relative to the direction of contaminated gas flow from said inlet, said conical side wall having a plurality of spaced holes extending transversely therethrough, said holes having a diameter ranging between 1/16 inch to ⅛ inch and opening in multiple radial directions from said conical bore within said gravity chamber;
        (2) an open front end substantially coextensive with said inlet to said vessel, and connected relative thereto for said front end to receive all of the incoming contaminated gas;
        (3) said holes in said conical side wall forming substantially the only exit for said contaminated gas entering said gravity chamber, said holes having a total area greater than the area of said inlet and having inner edge portions protruding inwardly into said conical bore and forming barriers around the inner edges of said holes, damming the flow of liquid particles over the inner surface of said conical side wall and through said holes, causing said liquid particles to form large drops which are subsequently jetted outside of said diffuser member through said holes with said gas and into said gravity chamber, most of the jetted-out large liquid drops falling to the bottom of said gravity chamber; and
    (d) at least one filter element disposed in said filter chamber and with said filter element in communication with said port in said chamber dividing wall for receiving the gas stream from said gravity chamber and filtering out fine foreign particles from gas passing through said filter element so that substantially particle free gas will exit from said outlet of said vessel.

2. The separator of claim 1, wherein said holes in said member are punched and said inner edge portions have perforation teeth extending radially inwardly into the bore of the strainer-diffuser member.

3. The separator of claim 1, wherein said diffuser member is insulated electrically from said vessel.

4. The separator of claim 1, wherein the total area of said holes is about one and a half to two times the area of said inlet.

5. The separator of claim 1, wherein said filter element comprises graded-density fiberglass material and said cleaned up gas flows from the coarser to the finer layers of said material.

6. The separator of claim 1, wherein the angle of convergence of said side wall of said diffuser member relative to its longitudinal axis is between 15° and 60°.

7. A separator for receiving an incoming contaminated gas stream containing foreign suspended particles therein comprising:
    (a) an elongate vessel defining a chamber having an inlet for receiving said contaminated gas stream and an outlet for discharging gas substantially free of said foreign particles;
    (b) a partitioning wall extending across said chamber between said inlet and said outlet for dividing said chamber into a separate gravity chamber having said inlet and a separate filter chamber having said outlet, said partitioning wall having a plurality of ports therethrough and being imperforate except for said ports and effective to confine the flow of gas from the gravity chamber to said filter chamber only through said ports;
    (c) a conical strainer-diffuser member disposed inside said gravity chamber and connected relative to said inlet to receive contaminated gas flow therefrom, said strainer-diffuser member having:

(1) a conical side wall forming a conical bore tapering inwardly relative to the direction of contaminated gas flow from said inlet, said conical side wall having a plurality of spaced holes extending transversely therethrough, said holes having a diameter ranging between 1/16 inch to ⅛ inch and opening in multiple radial directions from said conical bore within said gravity chamber;

(2) an open front end substantially coextensive with said inlet to said vessel, and connected relative thereto for said front end to receive all of the incoming contaminated gas;

(3) said holes in said conical side wall forming substantially the only exit for said contaminated gas entering said gravity chamber, said holes having a total area greater than the area of said inlet and having inner edge portions protruding inwardly into said conical bore and forming barriers around the inner edges of said holes, damming the flow of liquid particles over the inner surface of said conical side wall and through said holes, causing said liquid particles to form large drops which are subsequently jetted outside of said diffuser member through said holes with said gas and into said gravity chamber, most of the jetted-out large liquid drops falling to the bottom of said gravity chamber; and (d) a multi-tube filter disposed in said filter chamber, each filter having a perforated tubular casing coupled to one of said ports in said partitioning wall, a fiberglass sleeve extending over and completely covering the perforations in said tubular casing for filtering out fine particles in the gas stream, and said gas flowing radially outwardly from said perforated tubular casings through said fiberglass sleeves into said filter chamber, the fine liquid mist in said gas coalescing into drops which move outwardly through the layers of the fiberglass, so that substantially particle free gas will exit from said outlet of said vessel;

(e) means associated with said elongate vessel and defining a sump having communication with the gravity chamber for collecting liquid falling from the strainer-diffuser member; and (f) means including an outlet from said sump and a liquid level control valve for controlling the level of liquid in said sump.

8. The separator of claim 7, wherein said holes in said member are punched and said inner edge portions have perforation teeth extending radially inwardly into the bore of the strainer-diffuser member.

9. The separator of claim 7, wherein said diffuser member is insulated electrically from said vessel.

10. The separator of claim 7, wherein the total area of said holes is greater than one and a half and less than two times the area of said inlet.

11. The separator of claim 7, wherein said filter elements comprise graded-density fiberglass material and said cleaned up gas flows from the coarser to the finer layers of said material.

12. The separator of claim 7, wherein the angle of convergence of said side wall of said diffuser member relative to its longitudinal axis is between 15° and 60°.

13. A separator for receiving an incoming contaminated gas stream containing foreign suspended particles therein, comprising:

(a) an elongate vessel defining a chamber having an inlet for receiving said contaminated gas stream and an outlet for discharging gas substantially free of said foreign particles;

(b) a multi-port partitioning wall extending across said chamber between said inlet and said outlet for dividing said chamber into a separate gravity chamber having said inlet and a separate filter chamber having said outlet, said partitioning wall being effective to confine the flow of gas from the gravity chamber to said filter chamber only through said ports therein;

(c) a strainer-diffuser member having:
 (1) a punched conical side wall forming a bore tapering inwardly relative to the direction of gas flow, said conical side wall having a plurality of spaced punched holes along the length of and around said strainer-diffuser member;
 (2) an open front end substantially coextensive with said inlet to said vessel, and connected relative thereto for said front end to receive all of the incoming gas; and
 (3) an imperforate rear end wall portion; said punched holes in said conical side wall having perforation teeth extending radially inwardly from the inner edges of said holes into said bore of said strainer-diffuser member, said perforation teeth forming barriers to the flow of liquid particles over the inner surface of said conical side wall and causing the liquid particles to agglomerate into pools around said perforation teeth, liquid from said pools being jetted outside of said strainer-diffuser member through said holes, the cleaned up gas flowing out from said strainer-diffuser member flowing into said ports of said partitioning wall, and most of the jetted out liquid drops falling to the bottom of said gravity chamber;

(d) a multi-tube filter disposed in said filter chamber, each filter having a perforated tubular casing coupled to a corresponding port in said partitioning wall, a fiberglass sleeve extending over and completely covering the perforations in said tubular casing for filtering out fine particles in the gas stream, and said gas flowing radially outwardly from said perforated tubular casings through said fiberglass sleeves into said filter chamber, the fine liquid mist in said gas coalescing into drops which move outwardly through the layers of fiberglass, so that substantially particle free gas will exit from said outlet of said vessel;

(e) means associated with said elongate vessel and defining a sump having communication with the gravity chamber for collecting liquid falling from the strainer-diffuser member;

(f) means associated with said elongate vessel and defining a sump having communication with the filter chamber for collecting liquid falling from said multi-tube filter; and (g) means including outlets from said sumps and liquid level control valves for controlling the level of liquid in said sumps.

14. The separator of claim 13, wherein said holes have a diameter ranging between 1/16 inch to ⅛ inch.

15. The separator of claim 14, wherein said strainer-diffuser member is insulated electrically from said vessel.

* * * * *